US009048984B2

(12) United States Patent
Yao et al.

(10) Patent No.: US 9,048,984 B2
(45) Date of Patent: Jun. 2, 2015

(54) CHANNEL SWITCHING METHOD, APPARATUS, AND SYSTEM

(71) Applicant: Huawei Device Co., Ltd, Shenzhen (CN)

(72) Inventors: Wenfeng Yao, Shenzhen (CN); Zaixian Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 187 days.

(21) Appl. No.: 13/944,580

(22) Filed: Jul. 17, 2013

(65) Prior Publication Data

US 2014/0024403 A1    Jan. 23, 2014

(30) Foreign Application Priority Data

Jul. 23, 2012    (CN) .......................... 2012 1 0255900

(51) Int. Cl.
*H04L 5/00*    (2006.01)
*H04W 36/00*    (2009.01)
*H04W 84/12*    (2009.01)

(52) U.S. Cl.
CPC ......... *H04L 5/0037* (2013.01); *H04W 36/0055* (2013.01); *H04W 84/12* (2013.01)

(58) Field of Classification Search
CPC ..... H04W 36/30; H04W 84/12; H04W 36/36; H04W 76/045; H04W 36/0055; H04W 36/18; H04W 84/04; H04W 84/047; H04W 88/06; H04L 5/0037
USPC ............ 455/3.04, 436, 437, 63.3, 560, 191.3, 455/199.1; 370/389, 357, 360
See application file for complete search history.

(56) References Cited

U.S. PATENT DOCUMENTS

| 6,122,513 | A  | * | 9/2000  | Bassirat ........................ 455/443 |
| 6,192,232 | B1 | * | 2/2001  | Iseyama ..................... 455/404.1 |
| 6,370,380 | B1 | * | 4/2002  | Norefors et al. .............. 455/436 |
| 6,473,413 | B1 | * | 10/2002 | Chiou et al. .................. 370/331 |
| 6,522,880 | B1 | * | 2/2003  | Verma et al. .................. 455/436 |

(Continued)

FOREIGN PATENT DOCUMENTS

| CN | 101193025 A | 6/2008 |
| CN | 101242643 A | 8/2008 |

(Continued)

OTHER PUBLICATIONS

International Search Report for App No. PCT/CN2013/079870, mailed Oct. 31, 2013, 11 pages.

(Continued)

*Primary Examiner* — Minh D Dao
(74) *Attorney, Agent, or Firm* — Slater & Matsil, L.L.P.

(57) ABSTRACT

A channel switching method, apparatus, and system are disclosed. A mobile terminal sends a channel switching command to a first access point, so that the first access point parses the channel switching command and sends a parsed channel switching command to a second access point and the second access point performs channel switching according to the parsed channel switching command. The mobile terminal receives a feedback message from the first access point. When the feedback message indicates that channel switching preparation of the second access point is ready, the mobile terminal breaks a connection to the first access point and sets up a connection to the second access point to complete the channel switching.

20 Claims, 5 Drawing Sheets

(56) References Cited

U.S. PATENT DOCUMENTS

| | | | | |
|---|---|---|---|---|
| 7,124,101 | B1* | 10/2006 | Mikurak | 705/35 |
| 7,313,113 | B1* | 12/2007 | Hills et al. | 370/332 |
| 8,229,440 | B2* | 7/2012 | Yoon et al. | 455/444 |
| 8,805,370 | B1* | 8/2014 | Kannan et al. | 455/436 |
| 8,948,135 | B2* | 2/2015 | Surface et al. | 370/331 |
| 2004/0015607 | A1* | 1/2004 | Bender et al. | 709/238 |
| 2006/0240832 | A1* | 10/2006 | Kim et al. | 455/438 |
| 2006/0291455 | A1* | 12/2006 | Katz et al. | 370/355 |
| 2007/0060128 | A1* | 3/2007 | Kil | 455/436 |
| 2007/0076661 | A1* | 4/2007 | Lin et al. | 370/331 |
| 2007/0127403 | A1* | 6/2007 | Lu et al. | 370/311 |
| 2008/0014943 | A1* | 1/2008 | Ahn et al. | 455/436 |
| 2008/0186917 | A1 | 8/2008 | Wu et al. | |
| 2008/0219452 | A1* | 9/2008 | Lu et al. | 380/283 |
| 2009/0086672 | A1* | 4/2009 | Gholmieh et al. | 370/329 |
| 2009/0190553 | A1 | 7/2009 | Masuda et al. | |
| 2009/0296660 | A1 | 12/2009 | Weng | |
| 2010/0172326 | A1 | 7/2010 | Kim et al. | |
| 2010/0260146 | A1 | 10/2010 | Lu | |
| 2011/0310726 | A1* | 12/2011 | Di et al. | 370/216 |
| 2013/0265885 | A1* | 10/2013 | Hassan | 370/248 |
| 2013/0301607 | A1* | 11/2013 | McCann et al. | 370/331 |
| 2013/0315141 | A1* | 11/2013 | Homchaudhuri et al. | 370/328 |
| 2014/0016628 | A1* | 1/2014 | McCann et al. | 370/338 |
| 2014/0226818 | A1* | 8/2014 | Wang et al. | 380/270 |
| 2014/0254363 | A1* | 9/2014 | Tanaka et al. | 370/230 |

FOREIGN PATENT DOCUMENTS

| | | |
|---|---|---|
| CN | 101690334 A | 3/2010 |
| JP | 2008502269 A | 1/2008 |
| WO | 2007142199 A1 | 12/2007 |

OTHER PUBLICATIONS

Japanese Office Action received in Application No. 2013-149518 mailed Apr. 30, 2014, 6 pages. (Partial Translation).

* cited by examiner

CHANNEL SWITCHING METHOD, APPARATUS, AND SYSTEM

CROSS-REFERENCE TO RELATED APPLICATIONS

This application claims priority to Chinese Patent Application No. 201210255900.1, filed on Jul. 23, 2012, which is hereby incorporated by reference in its entirety.

TECHNICAL FIELD

The present invention relates to the field of wireless network communications technologies, and in particular, to a channel switching method, apparatus, and system.

BACKGROUND

In wireless communication, a mobile terminal (STA, Station) is connected to an access point (AP, Access Point) through a channel, where the channel is selected when the access point AP is powered on. When a channel environment becomes poor, for example, when there is interference caused by a radar, microwave, and the like, channel performance is affected and a transmission rate decreases. As a result, an application requirement for a user cannot be met. Especially, an application similar to Wi-Fi Direct (a technology in which devices on a wireless network can be interconnected directly without using a wireless router) is sensitive to a transmission rate. To meet an application requirement for a user, at this time, channel switching is required to change to a channel with a better environment.

In the prior art, a channel switching method is provided. An access point AP actively initiates channel switching, forces a mobile terminal Station that is connected to the AP to go offline. At this time, the AP breaks a connection to the Station, and the AP performs a channel switching operation. At this time, the mobile terminal Station that is forced to go offline re-searches for an AP that can be accessed, and sets up a communication connection to a neighboring AP that is found.

In a process of implementing the present invention, the inventor finds that the prior art has at least the following problems: in a method provided in the prior art, after an AP breaks a connection to a Station, a user needs to perform manual setting to search for an AP that can be accessed, and therefore the user needs to perform a complex operation. On the other hand, after the Station breaks a connection to the AP, the Station may not find or spends a long time in searching for an AP that can be accessed, thereby resulting in a long service interruption duration and poor user experience.

SUMMARY

To solve the foregoing technical problems, embodiments of the present invention provides a channel switching method, apparatus, and system, so that automatic channel switching may be implemented to reduce a service interruption duration during channel switching and improve user experience.

In one aspect, an embodiment of the present invention provides a channel switching method that is applied at a mobile terminal side, where the method includes:

sending, by a mobile terminal, a channel switching command to a first access point, so that the first access point parses the channel switching command and sends a parsed channel switching command to a second access point and the second access point performs channel switching according to the parsed channel switching command; and receiving, by the mobile terminal, a feedback message from the first access point; and when the feedback message indicates that channel switching preparation of the second access point is ready, breaking, by the mobile terminal, a connection to the first access point and setting up a connection to the second access point to complete the channel switching.

Preferably, the method further includes:

After the mobile terminal sets up the connection to the first access point, testing, by the mobile terminal, a current connection rate, and when the current connection rate is lower than a set rate threshold, performing, by the mobile terminal, a step of initiating a channel switching command to the first access point.

Preferably, the channel switching command includes the set rate threshold and a frequency scan interval; and the second access point performs channel scan and switching processing according to the set rate threshold and the frequency scan interval.

Preferably, the method further includes:

when the feedback message indicates that a channel with a rate that is higher than the set rate threshold is not found after the second access point performs channel scan, sending, by the mobile terminal, a frequency scan interval adjustment command to the first access point, so that the first access point sends the frequency scan interval adjustment command to the second access point and the second access point performs channel scan and switching processing according to an updated frequency scan interval.

Preferably, the method further includes:

when the feedback message indicates that a channel with a rate that is higher than the set rate threshold is not found after the second access point performs channel scan, and a maximum rate value carried in the feedback message is higher than the current connection rate value, sending, by the mobile terminal, a frequency adjustment command to the first access point, so that the first access point sends the frequency adjustment command to the second access point and the second access point performs, according to the maximum rate value carried in the frequency adjustment command, frequency adjustment to complete the channel switching, where the maximum rate value is a maximum channel transmission rate obtained when the second access point performs channel scan.

In another aspect, an embodiment of the present invention provides a channel switching method that is applied at a wireless access device side, where the wireless access device includes a first access point and a second access point, and the method includes:

receiving, by the first access point, a channel switching command sent by a mobile terminal, parsing the channel switching command, and sending a parsed channel switching command to the second access point, so that the second access point performs channel switching according to the parsed channel switching command;

when channel switching preparation of the second access point is ready, sending, by the second access point, a feedback message to the first access point, and sending, by the first access point, the feedback message to the mobile terminal;

receiving a request for breaking a connection to the first access point sent by the mobile terminal, and breaking the connection between the first access point and the mobile terminal; and receiving a request for setting up a connection to the second access point sent by the mobile terminal, and setting up the connection between the second access point and the mobile terminal.

Preferably, that the second access point performs channel switching according to the parsed channel switching command is:

performing, by the second access point, according to a set rate threshold and a frequency scan interval that are carried in the channel switching command, channel scan and switching processing.

Preferably, the method further includes:

when a channel with a rate that is higher than the set rate threshold is not found after the second access point performs channel scan, automatically adjusting, by the second access point, the frequency scan interval, and performing channel scan and switching processing according to an adjusted frequency scan interval; or when a channel with a rate that is higher than the set rate threshold is not found after the second access point performs channel scan, sending, by the second access point, the feedback message, and forwarding, by the first access point, the feedback message to the mobile terminal; adjusting the frequency scan interval according to a frequency scan interval adjustment command that is sent by the mobile terminal and forwarded by the first access point; and performing channel scan and switching processing according to an adjusted frequency scan interval.

Preferably, the method further includes:

when a channel with a rate that is higher than the set rate threshold is not found after the second access point performs channel scan, sending the feedback message, and forwarding the feedback message, by the first access point, to the mobile terminal, where the feedback message carries a maximum channel transmission rate obtained when the second access point performs channel scan; and receiving, by the second access point, a frequency adjustment command that is sent by the mobile terminal and forwarded by the first access point; and adjusting, according to a maximum rate value carried in the frequency adjustment command, a working frequency to complete the channel switching.

In yet another aspect, an embodiment of the present invention provides a mobile terminal, including:

a first sending unit, configured to send a channel switching command to a first access point, so that the first access point parses the channel switching command and sends a parsed channel switching command to a second access point and the second access point performs channel switching according to the parsed channel switching command; and a switching unit, configured to receive a feedback message from the first access point, where when the feedback message indicates that channel switching preparation of the second access point is ready, the mobile terminal breaks a connection to the first access point and sets up a connection to the second access point to complete the channel switching.

Preferably, the mobile terminal further includes:

a rate testing unit, configured to test a current connection rate after the mobile terminal sets up the connection to the first access point; and when the current connection rate is lower than a set rate threshold, use a sending unit.

Preferably, the channel switching command includes the set rate threshold and a frequency scan interval; and the second access point performs channel scan and switching processing according to the set rate threshold and the frequency scan interval.

Preferably, the mobile terminal further includes:

a second sending unit, configured to, when the feedback message indicates that a channel with a rate that is higher than the set rate threshold is not found after the second access point performs channel scan, send a frequency scan interval adjustment command to the first access point, so that the first access point sends the frequency scan interval adjustment command to the second access point and the second access point performs channel scan and switching processing according to an updated frequency scan interval.

Preferably, the mobile terminal further includes:

a third sending unit, configured to, when the feedback message indicates that a channel with a rate that is higher than the set rate threshold is not found after the second access point performs channel scan, and a maximum rate value carried in the feedback message is higher than the current connection rate value, the mobile terminal sends a frequency adjustment command to the first access point, so that the first access point sends the frequency adjustment command to the second access point and the second access point performs, according to the maximum rate value carried in the frequency adjustment command, frequency adjustment to complete the channel switching, where the maximum rate value is a maximum channel transmission rate obtained when the second access point performs channel scan.

In still another aspect, an embodiment of the present invention provides a wireless access device, where the wireless access device includes a first access point and a second access point, and the first access point is connected to a mobile terminal.

The first access point is configured to receive a channel switching command sent by the mobile terminal, parse the channel switching command, and send a parsed channel switching command to the second access point, so that the second access point performs channel switching according to the parsed channel switching command; receive a feedback message sent by the second access point and send the feedback message to the mobile terminal; and receive a request for breaking a connection sent by the mobile terminal and break a connection to the mobile terminal; and the second access point is configured to receive the parsed channel switching command sent by the first access point and perform channel switching, and when channel switching preparation is ready, send the feedback message to the first access point; and receive a request for setting up a connection sent by the mobile terminal and set up a connection to the mobile terminal.

Preferably, the first access point further includes a sending unit, a parsing unit, a feedback unit, and a breaking unit, where the receiving unit is configured to receive the channel switching command sent by the mobile terminal;

the parsing unit is configured to parse the channel switching command received by the receiving unit, and send the parsed channel switching command to the second access point, so that the second access point performs the channel switching according to the parsed channel switching command;

the feedback unit is configured to receive the feedback message from the second access point, and when the feedback message indicates that the channel switching preparation of the second access point is ready, send the feedback message to the mobile terminal; and the breaking unit is configured to receive the request for breaking a connection sent by the mobile terminal, and break the connection to the mobile terminal; and the second access point includes a first channel switching unit, a fourth sending unit, and a connection setup unit, where the first channel switching unit is configured to receive the parsed channel switching command sent by the first access point and perform the channel switching;

the fourth sending unit is configured to send the feedback message to the first access point; and the connection setup unit is configured to receive the request for setting up a connection sent by the mobile terminal, and set up the connection to the mobile terminal.

Preferably, the first channel switching unit is further configured to perform channel scan and switching processing according to a set rate threshold and a frequency scan interval that are carried in the channel switching command.

Preferably, the second access point further includes:

a first frequency adjusting unit, configured to, when a channel with a rate that is higher than the set rate threshold is not found after channel scan is performed, automatically adjust the frequency scan interval, and perform channel scan and switching processing according to an adjusted frequency scan interval.

Preferably, the second access point further includes:

a fifth sending unit, configured to, when a channel with a rate that is higher than the set rate threshold is not found after channel scan is performed, send the feedback message, so that the first access point forwards the feedback message to the mobile terminal; and a second frequency adjusting unit, configured to adjust the frequency scan interval according to a frequency scan interval adjustment command that is sent by the mobile terminal and forwarded by the first access point; and perform channel scan and switching processing according to an adjusted frequency scan interval.

Preferably, the second access point further includes:

a sixth sending unit, configured to, when a channel with a rate that is higher than the set rate threshold is not found after channel scan is performed, send the feedback message to the first access point, so that the first access point forwards the feedback message to the mobile terminal, where the feedback message carries a maximum channel transmission rate obtained when the second access point performs channel scan; and a second channel switching unit, configured to receive a frequency adjustment command that is sent by the mobile terminal and forwarded by the first access point, and perform, according to a maximum rate value carried in the frequency adjustment command, frequency adjustment to complete the channel switching.

In a last aspect, an embodiment of the present invent provides a channel switching system, where the system includes a mobile terminal and a wireless access device, and the wireless access device includes a first access point and a second access point, where the mobile terminal is configured to send a channel switching command to the first access point, so that the first access point parses the channel switching command and sends a parsed channel switching command to the second access point and the second access point performs channel switching according to the parsed channel switching command; receive a feedback message from the first access point; and when the feedback message indicates that channel switching preparation of the second access point is ready, break a connection to the first access point and set up a connection to the second access point to complete the channel switching; and the wireless access device is configured for the first access point to receive the channel switching command sent by the mobile terminal, parse the channel switching command, and send the parsed channel switching command to the second access point, so that the second access point performs the channel switching according to the parsed channel switching command; when the channel switching preparation of the second access point is ready, the first access point sends the feedback message to the mobile terminal, where the feedback message is sent by the second access point to the first access point; receive a request for breaking a connection to the first access point sent by the mobile terminal, and break the connection between the first access point and the mobile terminal; and receive a request for setting up a connection to the second access point sent by the mobile terminal, and set up the connection between the second access point and the mobile terminal.

Embodiments of the present invention can bring the following benefit effects: An embodiment of the present invention provides a channel switching method, where a mobile terminal actively initiates a channel switching command, a first access point receives and parses the channel switching command sent by the mobile terminal, and sends a parsed command to a second access point; the second access point performs channel switching according to the channel switching command; and the mobile terminal receives a feedback message that is sent by the second access point and forwarded by the first access point. When the feedback message indicates that channel switching preparation of the second access point is ready, the mobile terminal breaks a connection to the first access point, and sets up a connection to the second access point to complete the channel switching. In the present invention, the mobile terminal actively initiates channel switching, the first access point at a wireless access device side receives the channel switching command and forwards the channel switching command to the second access point, so that the second access point automatically completes channel searching and switching operations according to the channel switching command. In a whole processing process, a user does not need to perform a complex manual operation at a mobile terminal side to implement automatic channel switching; on the other hand, only after the second access point performs channel switching successfully, the mobile terminal breaks the connection to the first access point and sets up the connection to the second access point according to the received feedback message to complete the channel switching, thereby greatly shortening a service interruption duration caused by channel switching and improving user experience.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Embodiments of the present invention provide a channel switching method, apparatus, and system, so that automatic channel switching may be implemented to reduce a service interruption duration during channel switching and improve user experience.

To make persons skilled in the art better understand the technical solutions in the present invention, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

A method provided in a first embodiment of the present invention may be applied to all handheld mobile terminals and non-handheld mobile terminals equipped with a wireless Wifi module, including but not limited to a cell phone, a tablet computer, and a notebook computer.

Figure 1:
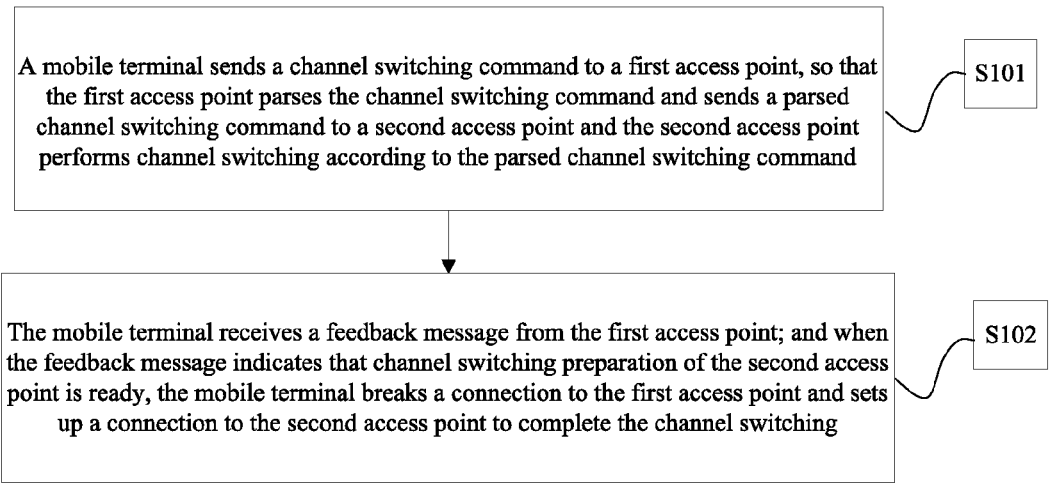
FIG. 1 is a schematic diagram of a channel switching method according to a first embodiment of the present invention.

FIG. 1 is a schematic diagram of a channel switching method according to a first embodiment of the present invention. The method is applied at a mobile terminal side, and the method includes:

S101: A mobile terminal sends a channel switching command to a first access point, so that the first access point parses the channel switching command and sends a parsed channel switching command to a second access point and the second access point performs channel switching according to the parsed channel switching command.

When the mobile terminal needs to perform channel switching, the mobile terminal actively sends a channel switching command to the first access point. Specifically, conditions for determining whether the mobile terminal needs to perform channel switching may be that: A transmission rate decreases, a current connection rate is lower than a set threshold, and the like. For example, when the mobile terminal determines that a decrease extent of a current transmission rate is higher than a set threshold, sending of a channel switching command is triggered. For another example, after the mobile terminal sets up a connection to the first access point, the mobile terminal starts to test a current connection rate and compares the current connection rate with a set rate threshold; and when the current connection rate is lower than the set rate threshold, sending of a channel switching command is triggered. The set rate threshold is preset by a system and a user, and may be comprehensively set according to a channel theoretical transmission rate and an actual working required rate. The set rate threshold is saved. Optionally, the set rate threshold may be saved in a configuration file. Persons of ordinary skill in the art may understand that a triggering condition for the mobile terminal to initiate a channel switching command is not limited in the present invention. All other embodiments obtained by persons of ordinary skill in the art without creative efforts shall fall within the protection scope of the present invention.

Specifically, the channel switching command may include a set rate threshold and a frequency scan interval. The set rate threshold is a working rate threshold set by a system or a user, and for a different bandwidth, the set rate threshold may be different, such as 20 KB, 40 KB, and the like. The frequency scan interval is a range for frequency scan. For example, if there are 100 frequency bands of channels in total, in the frequency scan interval, it may be set 1 to 20 channels or 20 to 40 channels are scanned. In the embodiment of the present invention, an access points at the wireless access device side performs channel scan and switching processing according to the set rate threshold and the frequency scan interval.

In another embodiment of the present invention, the channel switching command may also include only a set rate threshold, and a scan interval is adjusted by an access point AP.

S102: The mobile terminal receives a feedback message from the first access point; and when the feedback message indicates that channel switching preparation of the second access point is ready, the mobile terminal breaks a connection to the first access point and sets up a connection to the second access point to complete the channel switching.

At the mobile terminal side, a feedback message sent by the first access point at the wireless access device side is received, where the feedback message is sent by the second access point to the first access point. When the feedback message indicates that channel switching preparation of the second access point is ready, the mobile terminal sends, to the first access point, a request for breaking a connection to the first access point; and when receiving a response message indicating that the first access point allows breaking of the connection, the mobile terminal breaks the connection to the first access point. Then, the mobile terminal sends, to the second access point, a request for setting up a connection; and when receiving a response message indicating that the second access point allows setup of the connection, the mobile terminal sets up the connection to the second access point. Until this time, the mobile terminal completes the channel switching.

In the first embodiment of the present invention, a mobile terminal actively initiates a channel switching request, and a user does not need to perform a complex operation to implement automatic channel switching; on the other hand, only after a second access point performs channel switching successfully, the mobile terminal breaks a connection to a first access point and sets up a connection to the second access point according to a received feedback message to complete the channel switching, thereby greatly shortening a service interruption duration caused by channel switching and improving user experience.

Figure 2:
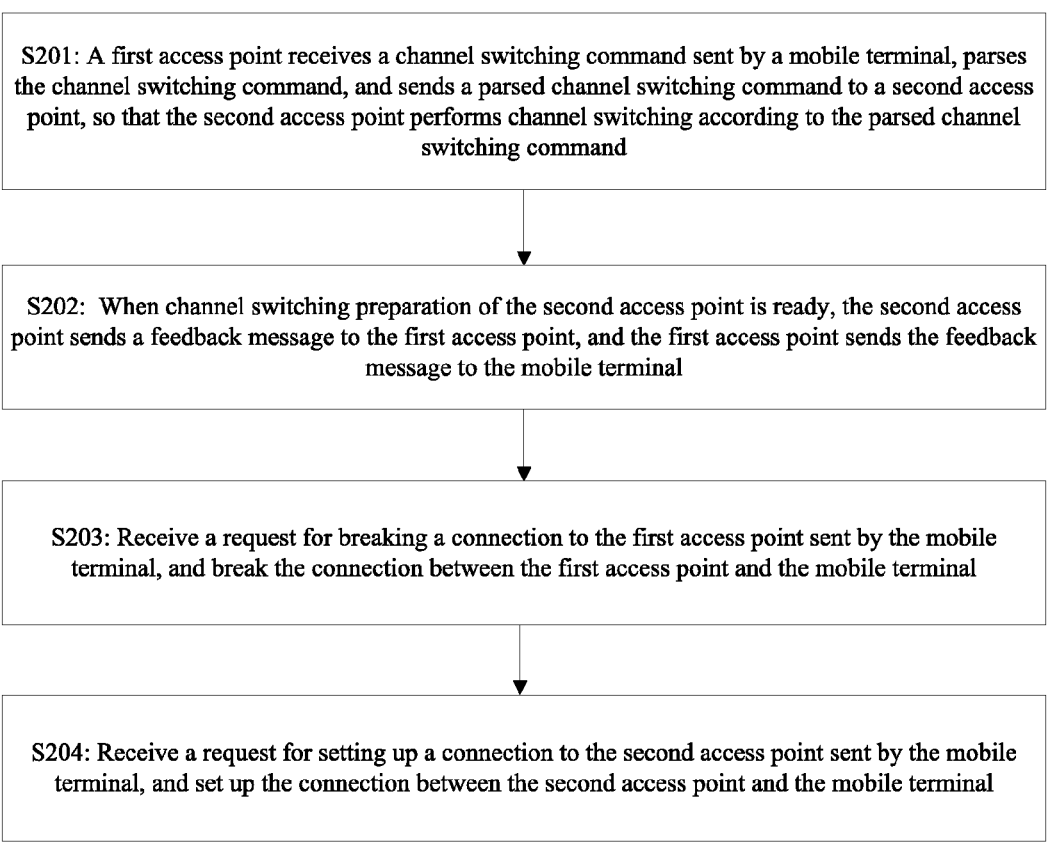
FIG. 2 is a schematic diagram of a channel switching method according to a second embodiment of the present invention.
Figure 3:
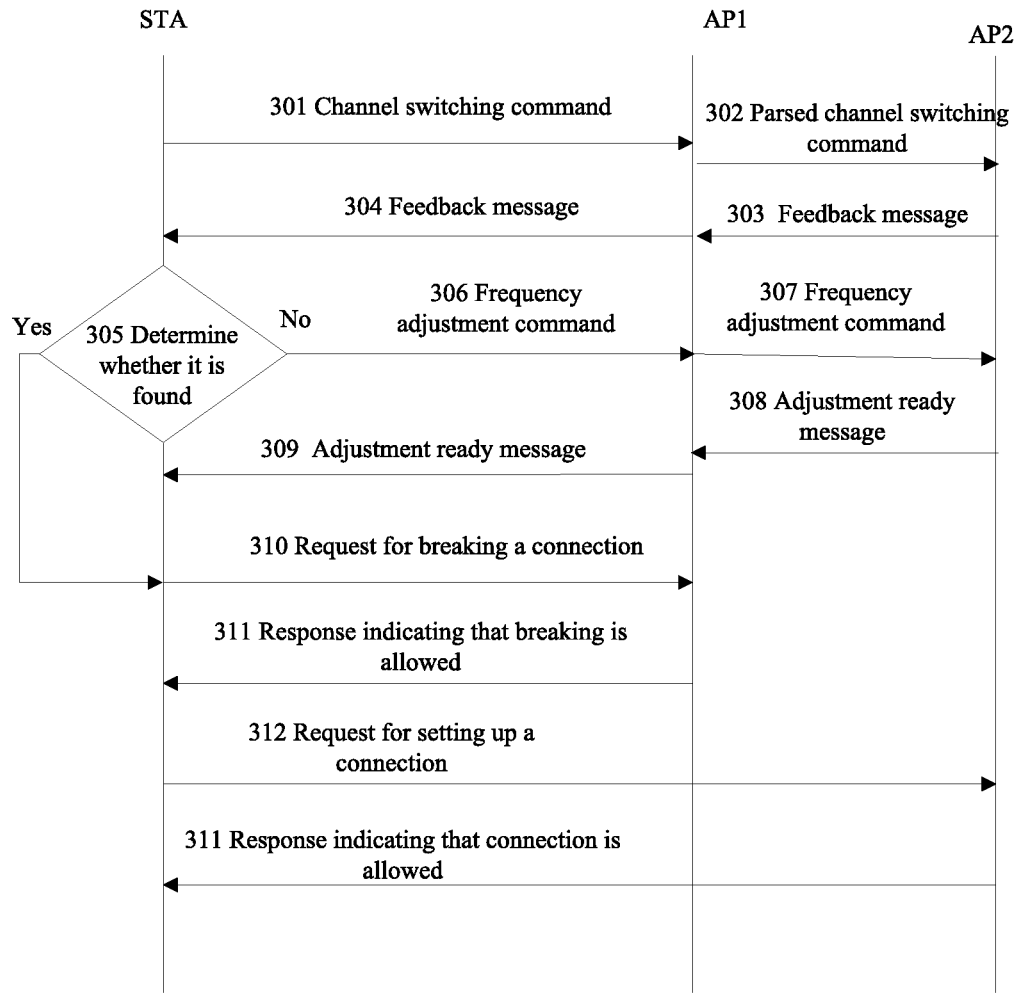
FIG. 3 is a schematic diagram of a channel switching method according to a third embodiment of the present invention.

FIG. 2 is a schematic diagram of a channel switching method according to a second embodiment of the present invention.

In the second embodiment of the present invention, the channel switching method is applied at a wireless access device side, where the wireless access device includes a first access point AP1 and a second access point AP2. The wireless access device may simultaneously send two routes of wireless signals for different channels, frequencies of the two routes of wireless signals are different and the two routes of wireless signals do not interfere with each other, and one route of signal (the first access point AP1) and a mobile terminal may be in a connection state, while the other route of signal (the second access point AP2) may perform a channel switching operation; and when the other route of signal performs switching successfully, the mobile terminal breaks a connection to the route of signal (the first access point AP1) and sets up a connection to the other route of signal (the second access point AP2), thereby greatly reducing a service interruption duration caused by channel switching.

S201: The first access point receives a channel switching command sent by the mobile terminal, parses the channel switching command, and sends a parsed channel switching command to the second access point, so that the second access point performs channel switching according to the parsed channel switching command.

At the wireless access device side, the first access point is currently connected to the mobile terminal. When the mobile terminal needs to perform channel switching, the mobile terminal sends a channel switching command to the first access point. After receiving the channel switching command, the first access point parses the command and obtains a set rate threshold and a frequency scan interval through parsing. When the channel switching command includes only a set rate threshold, a parsing result is the set rate threshold. The first access point sends a parsed channel switching command to the second access point, and the second access point performs channel scan and channel switching operations according to a frequency of the first access point, the frequency scan interval, and the set rate threshold. After the second access point performs channel switching, the second access point sends a feedback message to notify the first access point that channel switching preparation of the second access point is ready.

S202: When channel switching preparation of the second access point is ready, the second access point sends a feedback message to the first access point, and the first access point sends the feedback message to the mobile terminal.

After the second access point performs the channel switching, the second access point sends the feedback message to notify the first access point that the channel switching preparation of the second access point is ready. The first access point returns a signal frame to the mobile terminal according to the feedback message sent by the second access point, to notify the mobile terminal that the second access point has performed the channel switching and the preparation is ready.

S203: Receive a request for breaking a connection to the first access point sent by the mobile terminal, and break the connection between the first access point and the mobile terminal.

After receiving the request for breaking a connection sent by the mobile terminal, the first access point sends a response message to the mobile terminal, indicating that the first access point allows breaking of the connection. At this time, the connection between the mobile terminal and the first access point is broken.

S204: Receive a request for setting up a connection to the second access point sent by the mobile terminal, and set up the connection between the second access point and the mobile terminal.

After receiving the request for setting up a connection sent by the mobile terminal, the second access point sends a response message to the mobile terminal, indicating that the second access point allows setup of the connection. At this time, the mobile terminal sets up the connection to the second access point. Until this time, the channel switching is complete.

In the second embodiment of the present invention, being different from a method in the prior art that a wireless access point AP actively initiates a channel switching command, a wireless access device performs channel switching in response to a switching command sent by a mobile terminal. A first access point is configured to receive a channel switching request sent by the mobile terminal, and sends a parsed request to a second access point; and the second access point performs a channel switching operation according to the parsed request. After the second access point completes channel switching, the second access point notifies the mobile terminal through the first access point, so that the mobile terminal breaks a connection to the first access point and sets up a connection to the second access point to complete the channel switching. In the second embodiment of the present invention, the wireless access device may simultaneously send two routes of wireless signals for two channels, and one route of signal (the first access point) and the mobile terminal may be in a connection state, while the other route of signal (the second access point) may perform a channel switching operation; and when the other route of signal performs switching successfully, the mobile terminal breaks a connection to the route of signal (the first access point) and sets up a connection to the other route of signal (the second access point), thereby greatly reducing a service interruption duration caused by channel switching.

A method provided in the embodiment of the present invention is described in detail in the following with reference to several specific embodiments.

S301: A mobile terminal STA sends a channel switching command to a first access point AP1.

In the embodiment of the present invention, after the mobile terminal STA sets up a connection to the first access point AP1, the mobile terminal STA starts to test a current connection rate and compares the current connection rate with a set rate threshold; when the current connection rate is higher than the set rate threshold, a transmission frequency corresponding to the current connection rate is set to a working frequency; and when the current connection rate is lower than the set rate threshold, sending of a channel switching command is triggered. It should be noted that rate testing may be performed in real time, and may also be triggered at a time preset by a system or a user. Sending of a channel switching command is triggered as long as it is determined that the current connection rate is lower than the set rate threshold.

The channel switching command includes a set rate threshold and a frequency scan interval. In another embodiment of the present invention, the channel switching command may also include only a set rate threshold.

S302: The first access point AP1 parses the channel switching command and sends a parsed channel switching command to a second access point AP2.

S303: The second access point AP2 performs scan according to the frequency scan interval carried in the channel switching command, and sends a feedback message to the first access point AP1 according to a scan result.

Specifically, when the second access point AP2 performs scan according to the frequency scan interval carried in the channel switching command, if a channel with a connection rate that is higher than the set rate threshold is found, the second access point AP2 stops scan, then sets its own transmission frequency to complete channel switching, and after that, feeds back, to the first access point AP1, a message indicating that channel switching preparation is ready.

If a channel with a connection rate that is higher than the set rate threshold is not found after the second access point AP2 scans an entire frequency band, the second access point AP2 also sends a feedback message to the first access point AP1; and at this time, the feedback message carries a maximum rate value obtained through channel scan. The maximum rate value is a maximum channel transmission rate obtained when the second access point AP2 performs channel scan. Specifically, when the second access point AP2 scans a frequency band, the second access point AP2 tests a transmission rate, compares the transmission rate with a maximum rate saved in a configuration file, saves a higher rate of the two rates in the configuration file and uses the higher rate as a current maximum rate, and also saves a channel frequency corresponding to the current maximum rate. When the entire frequency band is scanned and a frequency band corresponding to a rate that is higher than the rate threshold is not found, the feedback message carrying the maximum rate value is sent to the first access point AP1.

S304: The first access point AP1 forwards the feedback message to the mobile terminal STA.

S305: The mobile terminal STA parses the feedback message and determines whether a channel with a rate that is higher than the set rate threshold is found. When the feedback message indicates that preparation of the second access point AP2 is ready, proceed to step S310; and when the feedback message indicates that a channel with a rate that is higher than the set rate threshold is not found and the maximum rate value carried in the feedback message is higher than the current connection rate value, proceed to step S306.

S306: The mobile terminal STA sends a frequency adjustment command to the first access point AP1.

The frequency adjustment command carries a channel frequency corresponding to the maximum rate value.

S307: The first access point AP1 forwards the frequency adjustment command to the second access point AP2.

S308: The second access point AP2 adjusts a working frequency and sends, to the first access point AP1, a feedback message indicating that adjustment preparation is ready.

S309: The first access point AP1 sends, to the mobile terminal STA, the feedback message indicating that the adjustment preparation is ready.

S310: The mobile terminal STA sends, to the first access point AP1, a request for breaking a connection.

S311: The first access point AP1 sends a response message to the mobile terminal STA, where the response message indicates that the first access point AP1 allows breaking of the connection.

S312: The mobile terminal STA sends, to the second access point AP2, a request for setting up a connection.

S313: The second access point AP2 sends a response message to the mobile terminal STA, where the response message indicates that the second access point AP2 allows setup of the connection.

Until this time, the channel switching is complete.

In the second embodiment of the present invention, when a second access point AP2 performs channel scan according to a rate threshold and a frequency scan interval that are carried in a channel switching command, and does not find a frequency band with a rate that is higher than the rate threshold, the second access point AP2 sends a feedback message carrying a maximum rate value to a mobile terminal ST. When receiving the feedback message and determining that the maximum rate value is higher than a current connection rate, the mobile terminal ST sends a frequency adjustment message to a first access point AP1, and the first access point AP1 forwards the frequency adjustment message to a second access point AP2, so that the second access point AP2 adjusts a working frequency to complete channel switching. Then, the mobile terminal STA breaks a connection to the first access point AP1 and sets up a connection to the second access point AP2 to complete the channel switching. In this way, even if a channel with a rate that is higher than a set rate threshold is not found, the mobile terminal STA may also obtain a preferable transmission rate, thereby ensuring that a service of the mobile terminal is performed normally.

Figure 4:
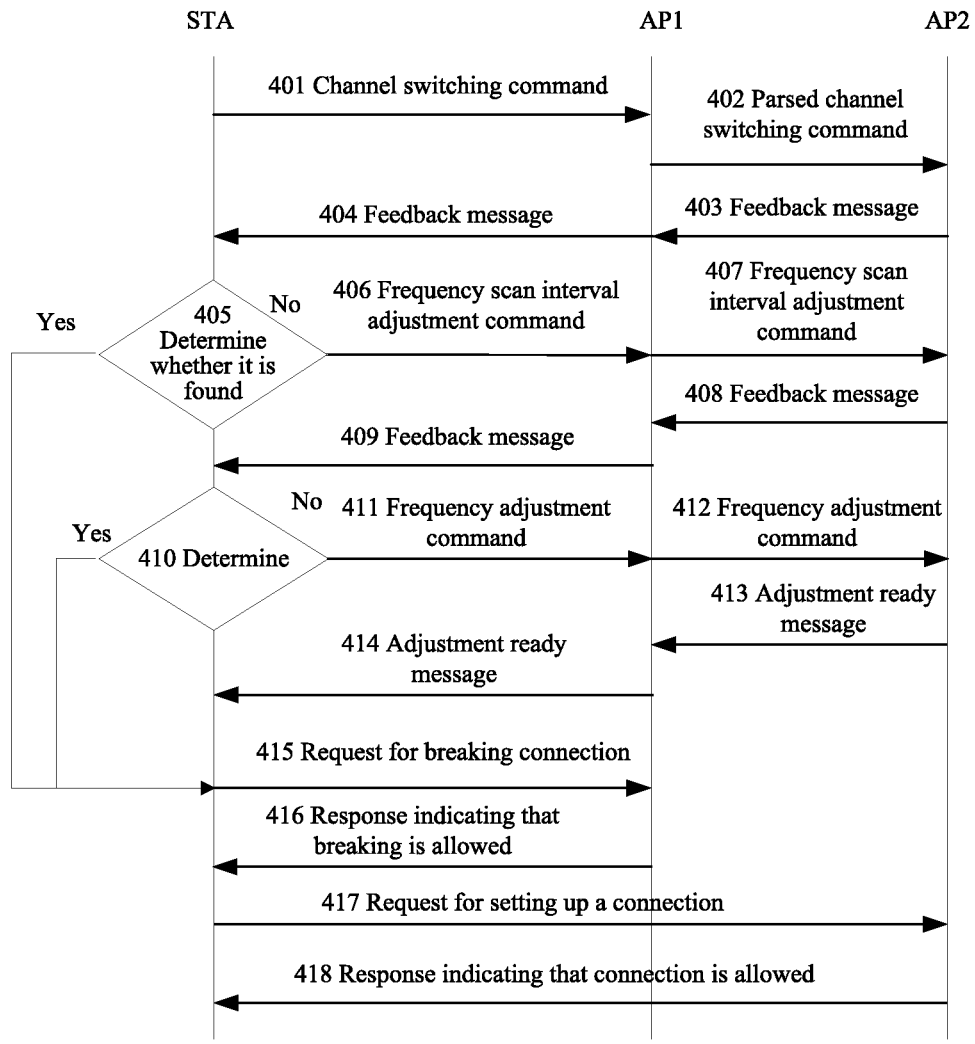
FIG. 4 is a schematic diagram of a channel switching method according to a fourth embodiment of the present invention.

In a fourth embodiment of the present invention, being different from the third embodiment, when a second access point performs channel scan and a channel with a rate that is higher than a set rate threshold is not found, a step that the second access point adjusts a frequency scan interval and re-performs scan is further included. Specifically, the second access point adjusts the frequency scan interval, which may be: The second access point actively adjusts the frequency scan interval and performs channel scan and switching processing according to an adjusted frequency scan interval. Another possible implementation manner is: When the second access point performs channel scan and does not find a channel with a rate that is higher than the set rate threshold, the second access point sends a feedback message and a first access point forwards the feedback message to a mobile terminal; and the second access point adjusts the frequency scan interval according to a frequency scan interval adjustment command that is sent by the mobile terminal and forwarded by the first access point, and performs channel scan and switching processing according to an adjusted frequency scan interval. In an embodiment shown in FIG. 4, a second implementation manner is introduced, and is described in details in the following.

S401: A mobile terminal STA sends a channel switching command to a first access point AP1.

The channel switching command includes a set rate threshold and a frequency scan interval.

S402: The first access point AP1 parses the channel switching command and sends a parsed channel switching command to a second access point AP2.

S403: The second access point AP2 performs scan according to the frequency scan interval carried in the channel switching command, and sends a feedback message to the first access point AP1 according to a scan result.

Specifically, when the second access point AP2 performs scan according to the frequency scan interval carried in the channel switching command, if a channel with a connection rate that is higher than the set rate threshold is found, the second access point AP2 stops scan, then sets its own transmission frequency to complete channel switching, and after that, feeds back, to the first access point AP1, a message indicating that channel switching preparation is ready.

If a channel with a connection rate that is higher than the set rate threshold is not found after the second access point AP2 scans an entire frequency band according to the frequency scan interval, the second access point AP2 also sends a feedback message to the first access point AP1; and at this time, the feedback message carries a maximum rate value obtained through channel scan and a result indicating that the set rate threshold is not found.

S404: The first access point AP1 forwards the feedback message to the mobile terminal STA.

S405: The mobile terminal STA parses the feedback message and determines whether a channel with a rate that is higher than the set rate threshold is found. When the feedback message indicates that preparation of the second access point AP2 is ready, proceed to step S415; and when the feedback message indicates that a channel with a rate that is higher than the set rate threshold is not found and the maximum rate value carried in the feedback message is lower than the current connection rate value, proceed to step S406.

S406: The mobile terminal STA sends a frequency scan interval adjustment command to the first access point AP1.

The frequency scan interval adjustment command carries an updated frequency scan interval. Or, the frequency scan interval adjustment command carries a frequency scan rule, which is parsed by the second access point AP2 to determine a frequency scan policy.

S407: The first access point AP1 forwards the frequency scan interval adjustment command to the second access point AP2.

S408: The second access point AP2 performs channel scan and switching processing according to the updated frequency scan interval, and sends a feedback message.

Specifically, when the second access point AP2 performs scan according to the updated frequency scan interval, if a channel with a connection rate that is higher than the set rate threshold is found, the second access point AP2 stops scan, then sets its own transmission frequency to complete channel switching, and after that, feeds back, to the first access point AP1, a message indicating that channel switching preparation is ready.

If a channel with a connection rate that is higher than the set rate threshold is not found after the second access point AP2 scans an entire frequency band according to the adjusted frequency scan interval, the second access point AP2 also sends a feedback message to the first access point AP1; and at this time, the feedback message carries a maximum rate value obtained through channel scan and a result indicating that the set rate threshold is not found.

S409: The first access point AP1 forwards the feedback message to the mobile terminal STA.

S410: The mobile terminal STA parses the feedback message and determines whether a channel with a rate that is higher than the set rate threshold is found. When the feedback message indicates that preparation of the second access point AP2 is ready, proceed to step S415; and when the feedback message indicates that a channel with a rate that is higher than the set rate threshold is not found and the maximum rate value carried in the feedback message is higher than the current connection rate value, proceed to step S411. Preferably, if the maximum rate value is still lower than the current connection rate value, update the frequency scan interval, and proceed to step S406.

S411: The mobile terminal STA sends a frequency adjustment command to the first access point AP1.

The frequency adjustment command carries a channel frequency corresponding to the maximum rate value.

S412: The first access point AP1 forwards the frequency adjustment command to the second access point AP2.

S413: The second access point AP2 adjusts a working frequency and sends, to the first access point AP1, a feedback message indicating that adjustment preparation is ready.

S414: The first access point AP1 sends, to the mobile terminal STA, the feedback message indicating that the adjustment preparation is ready.

S415: The mobile terminal STA sends, to the first access point AP1, a request for breaking a connection.

S416: The first access point AP1 sends a response message to the mobile terminal STA, where the response message indicates that the first access point AP1 allows breaking of the connection.

S417: The mobile terminal STA sends, to the second access point AP2, a request for setting up a connection.

S418: The second access point AP2 sends a response message to the mobile terminal STA, where the response message indicates that the second access point AP2 allows setup of the connection.

Until this time, the channel switching is complete.

In another embodiment of the present invention, when a second access point AP2 performs channel scan and does not find a channel with a rate that is higher than a set rate threshold, the second access point AP2 automatically adjusts a frequency scan interval, and performs channel scan and switching processing according to an adjusted frequency scan interval, thereby reducing the number of times of interactions and improving switching efficiency. Specifically, a processing process that the second access point AP2 automatically adjusts the frequency scan interval is: The second access point AP2 calculates, according to a channel range scanned for the first time, a range to be scanned for the second time, for example, if a range scanned for the first time is channels 1 to 20 and channels 40 to 60, when a channel with a rate that is higher than the set rate threshold is not found after these channels are scanned, the second access point AP2 broadens a scan range based on the range scanned for the first time, for example, channels 20 to 40 and channels 60 to 80 are scanned. The scan range is broadened gradually until all channels are scanned.

Figure 5:
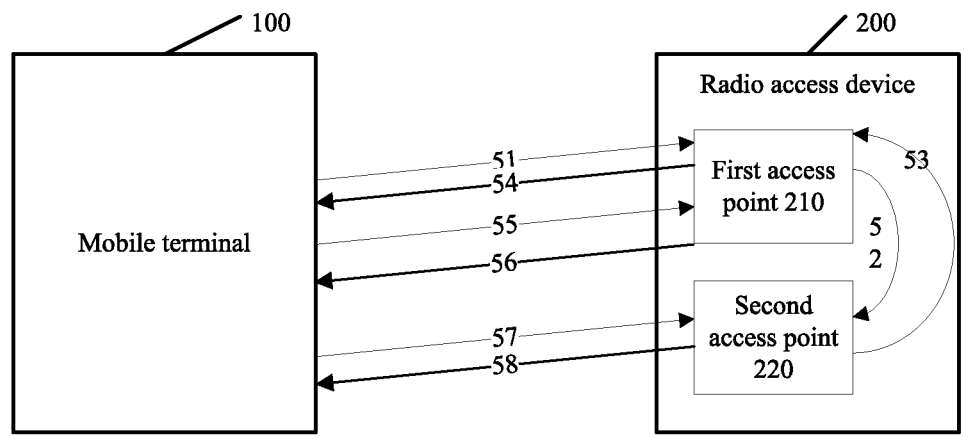
FIG. 5 is a schematic diagram of a channel switching system according to an embodiment of the present invention.

FIG. 5 is a schematic diagram of a channel switching system according to an embodiment of the present invention.

The system includes a mobile terminal 100 and a wireless access device 200, where the wireless access device includes a first access point 210 and a second access point 220;

The mobile terminal 100 is configured to send a channel switching command to the first access point 210 (as shown by an arrow 51 in FIG. 5), so that the first access point 210 parses the channel switching command and sends a parsed channel switching command to the second access point 220 and the second access point 220 performs channel switching according to the parsed channel switching command; receive a feedback message from the first access point 210 (as shown by an arrow 54 in FIG. 5), and when the feedback message indicates that channel switching preparation of the second access point 220 is ready, break a connection to the first access point 210 (as shown by an arrow 55 in FIG. 5) and set up a connection to the second access point 220 (as shown by an arrow 57 in FIG. 5) to complete the channel switching; and the wireless access device 200, including the first access point 210 and the second access point 220, configured for the first access point 210 to receive the channel switching command sent by the mobile terminal 100, parse the channel switching command, and send the parsed channel switching command to the second access point 220 (as shown by an arrow 52 in FIG. 5), so that the second access point 220 performs the channel switching according to the parsed channel switching command; when the channel switching preparation of the second access point 220 is ready, the second access point 220 sends the feedback message to the first access point 210 (as shown by an arrow 53 in FIG. 5), and the first access point 210 sends the feedback message to the mobile terminal 100 (as shown by the arrow 54 in FIG. 5); receive a request for breaking a connection to the first access point 210 sent by the mobile terminal 100, and break the connection between the first access point 210 and the mobile terminal 100 (as shown by an arrow 56 in FIG. 5); and receive a request for setting up a connection to the second access point 220 sent by the mobile terminal 100, and set up the connection between the second access point 220 and the mobile terminal 100 (as shown by an arrow 58 in FIG. 5).

Figure 6:
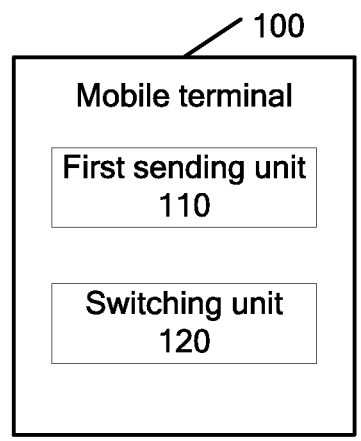
FIG. 6 is schematic diagram of a mobile terminal according to an embodiment of the present invention.

FIG. 6 is schematic diagram of a mobile terminal according to an embodiment of the present invention, where the mobile terminal includes:

a first sending unit 110, configured to send a channel switching command to a first access point, so that the first access point parses the channel switching command and sends a parsed channel switching command to a second access point and the second access point performs channel switching according to the parsed channel switching command;

a switching unit 120, configured to receive a feedback message from the first access point, where when the feedback message indicates that channel switching preparation of the second access point is ready, the mobile terminal breaks a connection to the first access point and sets up a connection to the second access point to complete the channel switching.

Preferably, the mobile terminal further includes:

a rate testing unit, configured to test a current connection rate after the mobile terminal sets up the connection to the first access point; and when the current connection rate is lower than a set rate threshold, use a sending unit.

Preferably, the channel switching command includes the set rate threshold and a frequency scan interval; and the second access point performs channel scan and switching processing according to the set rate threshold and the frequency scan interval.

Preferably, the mobile terminal further includes:

a second sending unit, configured to, when the feedback message indicates that a channel with a rate that is higher than the set rate threshold is not found after the second access point performs channel scan, send a frequency scan interval adjustment command to the first access point, so that the first access point sends the frequency scan interval adjustment command to the second access point and the second access point performs channel scan and switching processing according to an updated frequency scan interval.

Preferably, the mobile terminal further includes:

a third sending unit, configured to, when the feedback message indicates that a channel with a rate that is higher than the set rate threshold is not found after the second access point performs channel scan, and a maximum rate value carried in the feedback message is higher than the current connection rate value, the mobile terminal sends a frequency adjustment command to the first access point, so that the first access point sends the frequency adjustment command to the second access point and the second access point performs, according to the maximum rate value carried in the frequency adjustment command, frequency adjustment to complete the channel switching, where the maximum rate value is a maximum channel transmission rate obtained when the second access point performs channel scan.

According to another aspect of an embodiment of the present invention, the present invention further provides a mobile terminal, where the mobile terminal includes:

a processor, configured to send a channel switching command to a first access point, so that the first access point parses the channel switching command and sends a parsed channel switching command to a second access point and the second access point performs channel switching according to the parsed channel switching command; receive a feedback message from the first access point, where when the feedback message indicates that channel switching preparation of the second access point is ready, the mobile terminal breaks a connection to the first access point and sets up a connection to the second access point to complete the channel switching.

The processor is further configured to test a current connection rate after the connection to the first access point is set up; and when the current connection rate is lower than a set rate threshold, initiate a channel switching command to the first access point.

The processor is further configured to, when the feedback message indicates that a channel with a rate that is higher than the set rate threshold is not found after the second access point performs channel scan, the mobile terminal sends a frequency scan interval adjustment command to the first access point, so that the first access point sends the frequency scan interval adjustment command to the second access point and the second access point performs channel scan and switching processing according to an updated frequency scan interval.

The processor is further configured to, when the feedback message indicates that a channel with a rate that is higher than the set rate threshold is not found after the second access point performs channel scan, and a maximum rate value carried in the feedback message is higher than the current connection rate value, the mobile terminal sends a frequency adjustment command to the first access point, so that the first access point sends the frequency adjustment command to the second access point and the second access point performs, according to the maximum rate value carried in the frequency adjustment command, frequency adjustment to complete the channel switching, where the maximum rate value is a maximum channel transmission rate obtained when the second access point performs channel scan.

Figure 7:
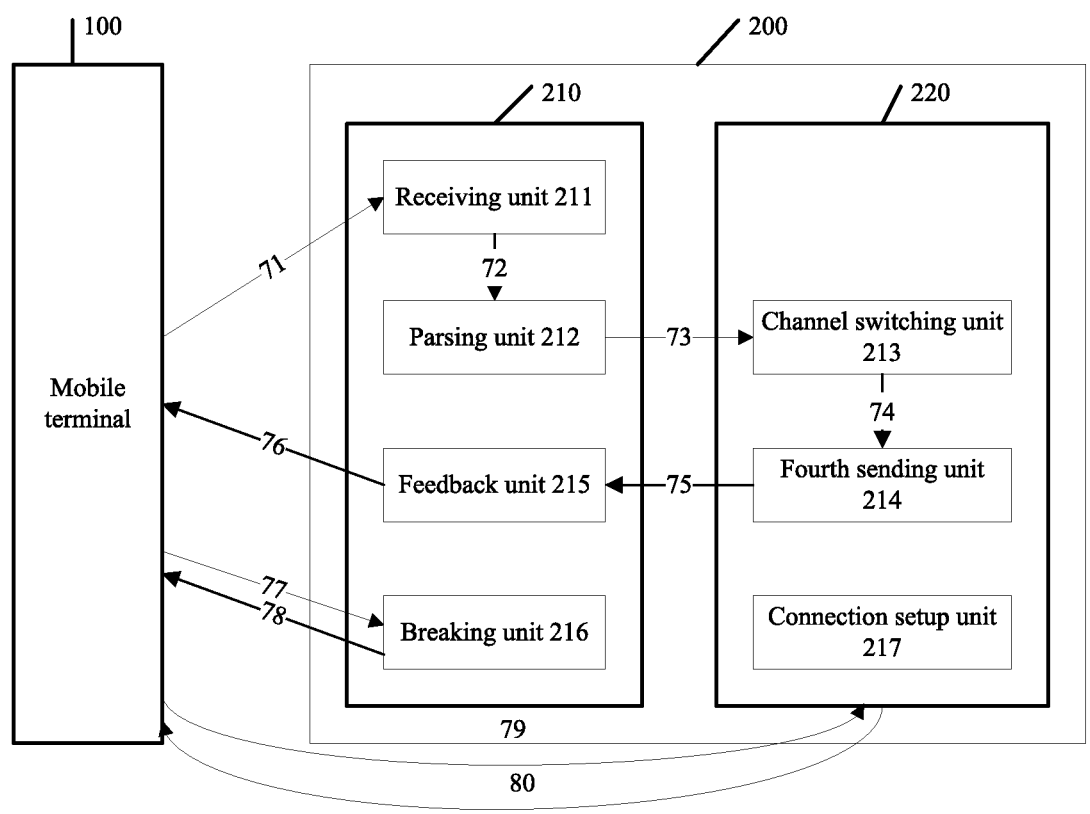
FIG. 7 is a schematic diagram of a wireless access device according to an embodiment of the present invention.

FIG. 7 is a schematic diagram of a wireless access device according to an embodiment of the present invention.

The wireless access device 200 includes a first access point 210 and a second access point 220, where the first access point 210 is configured to receive a channel switching command sent by a mobile terminal 100, parse the channel switching command, and send a parsed channel switching command to the second access point 220, so that the second access point 220 performs channel switching according to the parsed channel switching command; receive a feedback message sent by the second access point 220 and send the feedback message to the mobile terminal 100; and receive a request for breaking a connection sent by the mobile terminal 100 and break a connection to the mobile terminal 100; and the second access point 220 is configured to receive the parsed channel switching command sent by the first access point 210 and perform channel switching, and when channel switching preparation is ready, send the feedback message to the first access point 210; and receive a request for setting up a connection sent by the mobile terminal 100 and set up a connection to the mobile terminal 100.

The first access point 210 includes a receiving unit 211, a parsing unit 212, a feedback unit 215, and a breaking unit 216, where the receiving unit 211 is configured to receive the channel switching command sent by the mobile terminal (as shown by an arrow 71 in FIG. 7), and send the channel switching command to the parsing unit 212 (as shown by an arrow 72 in FIG. 7);

the parsing unit 212 is configured to parse the channel switching command received by the receiving unit, and send the parsed channel switching command to the second access point 220 (as shown by an arrow 73 in FIG. 7), so that the second access point 220 performs the channel switching according to the parsed channel switching command;

the feedback unit 215 is configured to receive the feedback message from the second access point 220 (as shown by an arrow 75 in FIG. 7), and when the feedback message indicates that the channel switching preparation of the second access point 220 is ready, send the feedback message to the mobile terminal 100 (as shown by an arrow 76 in FIG. 7); and the breaking unit 216 is configured to receive the request for breaking a connection sent by the mobile terminal (as shown by an arrow 77 in FIG. 7), and break the connection to the mobile terminal (as shown by an arrow 78 in FIG. 7).

The second access point 220 includes a first channel switching unit 213, a fourth sending unit 214, and a connection setup unit 217, where the channel switching unit 213 is configured to receive the parsed channel switching command sent by the first access point 210 and perform channel switching; and when the channel switching preparation is ready, notify the fourth sending unit (as shown by an arrow 74 in FIG. 7);

the fourth sending unit 214 is configured to, when the channel switching preparation is ready, sends the feedback message to the first access point 210 (as shown by the arrow 75 in FIG. 7); and the connection setup unit 217 is configured to receive the request for setting up a connection sent by the mobile terminal 100 (as shown by an arrow 79 in FIG. 7), and set up the connection to the mobile terminal 100 (as shown by an arrow 80 in FIG. 7).

Preferably, the first channel switching unit is further configured to perform channel scan and switching processing according to a set rate threshold and a frequency scan interval that are carried in the channel switching command.

Preferably, the second access point further includes a first frequency adjusting unit, configured to, when a channel with a rate that is higher than the set rate threshold is not found after channel scan is performed, automatically adjust the frequency scan interval, and perform channel scan and switching processing according to an adjusted frequency scan interval.

Preferably, the second access point further includes:

a fifth sending unit, configured to, when a channel with a rate that is higher than the set rate threshold is not found after channel scan is performed, send the feedback message, so that the first access point forwards the feedback message to the mobile terminal; and a second frequency adjusting unit, configured to adjust the frequency scan interval according to a frequency scan interval adjustment command that is sent by the mobile terminal and forwarded by the first access point; and perform channel scan and switching processing according to an adjusted frequency scan interval.

Preferably, the second access point further includes:

a sixth sending unit, configured to, when a channel with a rate that is higher than the set rate threshold is not found after channel scan is performed, send the feedback message to the first access point, so that the first access point forwards the feedback message to the mobile terminal, where the feedback message carries a maximum channel transmission rate obtained when the second access point performs channel scan; and a second channel switching unit, configured to receive a frequency adjustment command that is sent by the mobile terminal and forwarded by the first access point, and perform, according to a maximum rate value carried in the frequency adjustment command, frequency adjustment to complete the channel switching.

According to yet another aspect of an embodiment of the present invention, the embodiment of the present invention further provides a wireless access device, including:

a processor, configured to receive a channel switching command sent by a mobile terminal, parse the channel switching command, and send a parsed channel switching command to a second access point, so that the second access point performs channel switching according to the parsed channel switching command; when channel switching preparation of the second access point is ready, send a feedback message to the first access point, so that the first access point forwards the feedback message to the mobile terminal; receive a request for breaking a connection to the first access point sent by the mobile terminal, and break the connection between the first access point and the mobile terminal; and receive a request for setting up a connection to the second access point sent by the mobile terminal, and set up the connection between the second access point and the mobile terminal.

Preferably, the processor is further configured to perform channel scan and switching processing according to a set rate threshold and a frequency scan interval that are carried in the channel switching command.

Preferably, the processor is further configured, when a channel with a rate that is higher than the set rate threshold is not found after the second access point performs channel scan, for the second access point to automatically adjust the frequency scan interval, and perform channel scan and switching processing according to an adjusted frequency scan interval.

Preferably, the processor is further configured, when a channel with a rate that is higher than the set rate threshold is not found after the second access point performs channel scan, for the second access point to send the feedback message to the first access point, so that the first access point forwards the feedback message to the mobile terminal; adjust the frequency scan interval according to a frequency scan interval adjustment command that is sent by the mobile terminal and forwarded by the first access point; and perform channel scan and switching processing according to an adjusted frequency scan interval.

Preferably, the processor is further configured to, when a channel with a rate that is higher than the set rate threshold is not found after the second access point performs channel scan, send the feedback message, so that the first access point forwards the feedback message to the mobile terminal, where the feedback message carries a maximum channel transmission rate obtained when the second access point performs channel scan; and the second access point receives a frequency adjustment command that is sent by the mobile terminal and forwarded by the first access point, and adjusts, according to a maximum rate value carried in the frequency adjustment command, a working frequency to complete the channel switching.

It should be noted that the relational terms herein such as first and second are used only to differentiate an entity or operation from another entity or operation, and do not require or imply any actual relationship or sequence between these entities or operations. Moreover, the terms "include", "comprise", and any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the article, or the device that includes the element.

The present invention may be described in a general context of computer-executable instructions, such as program modules, executed by a computer. Generally, program modules include routines, programs, objects, components, data structures that perform particular tasks or implement particular abstract data types. The present invention may also be practiced in a distributed computing environment, and in such a distributed computing environment, a task is performed by remote processing devices that are connected through a communication network. In the distributed computing environment, a program module may be located in both local and remote computer storage media including a storage device.

The foregoing descriptions are merely specific embodiments of the present invention. It should be noted that persons of ordinary skill in the art may still make several improvements and modifications without departing from the principle of the present invention. These improvements and modifications shall also fall within the protection scope of the present invention.

What is claimed is:

1. A channel switching method applied at a mobile terminal side, the method comprising:
   sending, by a mobile terminal, a channel switching command to a first access point, so that the first access point parses the channel switching command and sends a parsed channel switching command to a second access point and the second access point performs channel switching according to the parsed channel switching command;
   receiving, by the mobile terminal, a feedback message from the first access point; and
   when the feedback message indicates that channel switching preparation of the second access point is ready, breaking, by the mobile terminal, a connection to the first access point and setting up a connection to the second access point to complete the channel switching.

2. The method according to claim 1, further comprising:
   after the mobile terminal sets up the connection to the first access point, testing, by the mobile terminal, a current connection rate; and
   when the current connection rate is lower than a set rate threshold, performing, by the mobile terminal, a step of initiating a channel switching command to the first access point.

3. The method according to claim 2, wherein the channel switching command comprises the set rate threshold and a frequency scan interval; and
   wherein the second access point performs channel scan and switching processing according to the set rate threshold and the frequency scan interval.

4. The method according to claim 3, the method wherein the feedback message indicates that a channel with a rate that is higher than the set rate threshold is not found after the second access point performs channel scan, further comprising:
   sending, by the mobile terminal, a frequency scan interval adjustment command to the first access point, so that the first access point sends the frequency scan interval adjustment command to the second access point and the second access point performing channel scan and switching processing according to an updated frequency scan interval.

5. The method according to claim 2, the method wherein the feedback message indicates that a channel with a rate that is higher than the set rate threshold is not found after the second access point performs channel scan, and a maximum rate value carried in the feedback message is higher than the current connection rate value further comprising:
   sending, by the mobile terminal, a frequency adjustment command to the first access point, so that the first access point sends the frequency adjustment command to the second access point and the second access point performs, according to the maximum rate value carried in the frequency adjustment command, frequency adjustment to complete the channel switching, wherein, the maximum rate value is a maximum channel transmission rate obtained when the second access point performs channel scan.

6. A channel switching method, applied at a wireless access device side, wherein the wireless access device comprises a first access point and a second access point, the first access point is connected to a mobile terminal, the method comprising:
   receiving, by the first access point, a channel switching command sent by the mobile terminal,
   parsing the channel switching command,
   sending a parsed channel switching command to the second access point, so that the second access point performs channel switching according to the parsed channel switching command;
   when channel switching preparation of the second access point is ready, sending, by the first access point, a feedback message to the mobile terminal, wherein the feedback message is sent by the second access point to the first access point;
   receiving a request for breaking a connection to the first access point sent by the mobile terminal,
   breaking the connection between the first access point and the mobile terminal in response to the request;
   receiving, a request for setting up a connection to the second access point sent by the mobile terminal; and
   setting up the connection between the second access point and the mobile terminal.

7. The method according to claim 6, wherein the second access point performs channel switching according to the parsed channel switching command by performing channel scan and switching processing according to a set rate threshold and a frequency scan interval that are carried in the channel switching command.

8. The method according to claim 7, further comprising:
   when a channel with a rate that is higher than the set rate threshold is not found after the second access point performs channel scan, automatically adjusting, by the second access point, the frequency scan interval and performing channel scan and switching processing according to an adjusted frequency scan interval; or
   when a channel with a rate that is higher than the set rate threshold is not found after the second access point performs channel scan, sending, by the second access point, the feedback message, and forwarding, by the first access point, the feedback message to the mobile terminal; adjusting the frequency scan interval according to a frequency scan interval adjustment command that is sent by the mobile terminal and forwarded by the first access point; and performing channel scan and switching processing according to an adjusted frequency scan interval.

9. The method according to claim 7, further comprising:
   when a channel with a rate that is higher than the set rate threshold is not found after the second access point performs channel scan, sending the feedback message from the first access point to the mobile terminal, wherein the feedback message carries a maximum channel transmission rate obtained when the second access point performs channel scan; and
   receiving, by the second access point, a frequency adjustment command that is sent by the mobile terminal and forwarded by the first access point; and adjusting, according to a maximum rate value carried in the frequency adjustment command, a working frequency to complete the channel switching.

10. A mobile terminal, comprising:
    a first sending unit, configured to send a channel switching command to a first access point, so that the first access point parses the channel switching command and sends a parsed channel switching command to a second access point and the second access point performs channel switching according to the parsed channel switching command; and a switching unit, configured to receive a feedback message from the first access point, wherein when the feedback message indicates that channel switching preparation of the second access point is ready, the mobile terminal breaks a connection to the first access point and sets up a connection to the second access point to complete the channel switching.

11. The mobile terminal according to claim 10, further comprising:
a rate testing unit, configured to test a current connection rate after the mobile terminal sets up the connection to the first access point and, when the current connection rate is lower than a set rate threshold, to use a sending unit.

12. The mobile terminal according to claim 11, wherein the channel switching command comprises the set rate threshold and a frequency scan interval and wherein the second access point performs channel scan and switching processing according to the set rate threshold and the frequency scan interval.

13. The mobile terminal according to claim 11, further comprising:
a third sending unit, configured to, when the feedback message indicates that a channel with a rate that is higher than the set rate threshold is not found after the second access point performs channel scan and a maximum rate value carried in the feedback message is higher than the current connection rate value, the mobile terminal sends a frequency adjustment command to the first access point, so that the first access point sends the frequency adjustment command to the second access point and the second access point performs, according to the maximum rate value carried in the frequency adjustment command, frequency adjustment to complete the channel switching, wherein the maximum rate value is a maximum channel transmission rate obtained when the second access point performs channel scan.

14. The mobile terminal according to claim 10, further comprising:
a second sending unit, configured to, when the feedback message indicates that a channel with a rate that is higher than the set rate threshold is not found after the second access point performs channel scan, send a frequency scan interval adjustment command to the first access point, so that the first access point sends the frequency scan interval adjustment command to the second access point and the second access point performs channel scan and switching processing according to an updated frequency scan interval.

15. A wireless access device comprising a first access point and a second access point, the first access point being connected to a mobile terminal, wherein:
the first access point is configured to receive a channel switching command sent by the mobile terminal, parse the channel switching command, and send a parsed channel switching command to the second access point, so that the second access point performs channel switching according to the parsed channel switching command; to receive a feedback message sent by the second access point and send the feedback message to the mobile terminal; and to receive a request for breaking a connection sent by the mobile terminal and break a connection to the mobile terminal; and
the second access point is configured to receive the parsed channel switching command sent by the first access point and perform channel switching and, when channel switching preparation is ready, send the feedback message to the first access point; and receive a request for setting up a connection sent by the mobile terminal and set up a connection to the mobile terminal.

16. The device according to claim 15, wherein the first access point comprises a receiving unit, a parsing unit, a feedback unit, and a breaking unit;
wherein the receiving unit is configured to receive the channel switching command sent by the mobile terminal;
wherein the parsing unit is configured to parse the channel switching command received by the receiving unit and to send the parsed channel switching command to the second access point, so that the second access point performs the channel switching according to the parsed channel switching command;
wherein the feedback unit is configured to receive the feedback message from the second access point and, when the feedback message indicates that the channel switching preparation of the second access point is ready, to send the feedback message to the mobile terminal;
wherein the breaking unit is configured to receive the request for breaking a connection sent by the mobile terminal and to break the connection to the mobile terminal;
wherein the second access point comprises a first channel switching unit, a fourth sending unit, and a connection setup unit;
wherein the first channel switching unit is configured to receive the parsed channel switching command sent by the first access point and perform the channel switching;
wherein the fourth sending unit is configured to send the feedback message to the first access point; and
wherein the connection setup unit is configured to receive the request for setting up a connection sent by the mobile terminal, and set up the connection to the mobile terminal.

17. The device according to claim 16, wherein the first channel switching unit is further configured to perform channel scan and switching processing according to a set rate threshold and a frequency scan interval that are carried in the channel switching command.

18. The device according to claim 17, wherein the second access point further comprises a first frequency adjusting unit, configured to, when a channel with a rate that is higher than the set rate threshold is not found after channel scan is performed, automatically adjust the frequency scan interval, and to perform channel scan and switching processing according to an adjusted frequency scan interval.

19. The device according to claim 17, wherein the second access point further comprises:
a fifth sending unit, configured to, when a channel with a rate that is higher than the set rate threshold is not found after channel scan is performed, send the feedback message, so that the first access point forwards the feedback message to the mobile terminal; and
a second frequency adjusting unit, configured to adjust the frequency scan interval according to a frequency scan interval adjustment command that is sent by the mobile terminal and forwarded by the first access point, and to perform channel scan and switching processing according to an adjusted frequency scan interval.

20. The device according to claim 17, wherein the second access point further comprises:
a sixth sending unit, configured to, when a channel with a rate that is higher than the set rate threshold is not found after channel scan is performed, send the feedback message to the first access point, so that the first access point forwards the feedback message to the mobile terminal, wherein the feedback message carries a maximum channel transmission rate obtained when the second access point performs channel scan; and a second channel switching unit, configured to receive a frequency adjustment command that is sent by the mobile terminal and forwarded by the first access point, and perform, according to a maximum rate value carried in the frequency adjustment command, frequency adjustment to complete the channel switching.

* * * * *